UNITED STATES PATENT OFFICE.

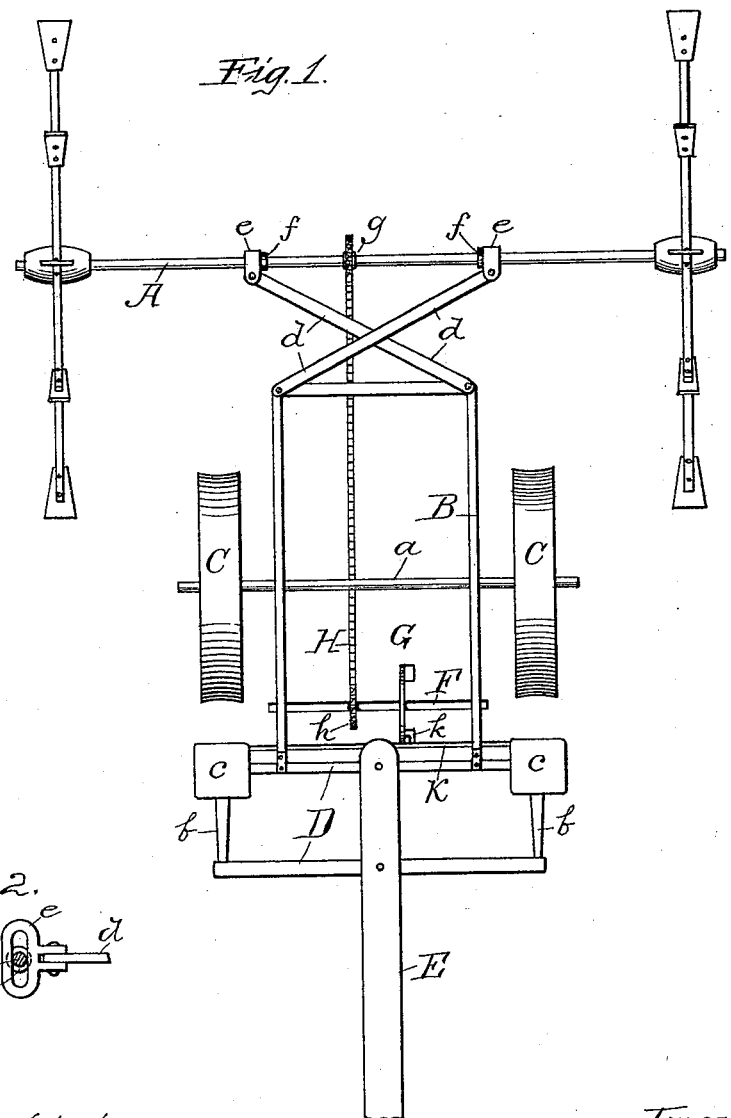

JOSEPH WILLIAM BETTENDORF, OF DAVENPORT, IOWA.

SUPPORTING-FRAME FOR CHECK-ROWERS.

SPECIFICATION forming part of Letters Patent No. 635,839, dated October 31, 1899.

Application filed July 22, 1899. Serial No. 724,746. (No model.)

*To all whom it may concern:*

Be it known that I, JOSEPH WILLIAM BETTENDORF, a citizen of the United States, and a resident of Davenport, in the county of Scott and State of Iowa, have invented certain new and useful Improvements in Supporting-Frames for Check-Rowers, of which the following is a full, clear, and exact description.

The object of my invention is to provide such a connection between the supporting-frame and the trailing spade-wheel marker of a check-rower corn-planter that said marker will travel in the straight line of draft and not be deflected therefrom by the deviations of the draft-animals or by the unevenness of the ground over which the said markers travel. This I accomplish by the means hereinafter fully described and as particularly pointed out in the claims.

In the drawings, Figure 1 is a plan view of my invention. Fig. 2 is a detail view of the bearing devices for the trailing marker-shaft.

Referring to the drawings, it will be observed that I have confined myself to the illustration of just the framework of my invention and have but slightly set forth the hopper or hopper-actuating mechanism. The reason for this is that the gist of my invention is confined to the attachment of the spade-wheel marker-shaft A to the frame B, carried by the ground-wheels C C.

The frame B is substantially rectangular and is intersected at about its center of length by the stationary shaft or axle a, on which said ground-wheels are journaled. The front end of this frame is either articulately or rigidly secured to the hopper-frame B, which latter has secured to the ends of its parallel transverse members the usual furrow-openers b b and hoppers c c of any suitable construction. The tongue E of the check-rower is rigidly secured to the transverse members of the hopper-frame, so as always to be in longitudinal alinement with the sides of frame B.

The rear transverse member of frame B has corresponding cross-links d d pivoted thereto at or near the ends of the same, and these links have their rear ends pivotally connected to clips e e, in which shaft A is journaled. In order to prevent the independent longitudinal movement of shaft A in its bearings, I prefer to provide it with the collars f f, which, as shown, are placed next to and in contact with bearing-clips e. This may be accomplished in any suitable manner.

Journaled in the side members of frame B near their forward ends is a transverse shaft F, which at about its center of length is provided with a sprocket-wheel h, through the medium of which and an endless chain H engaging therewith and with a sprocket-wheel g it is driven by shaft A, at about the center of length of which the latter sprocket g is secured. Near the sprocket h shaft F is provided with a wheel G of suitable diameter, which is provided with a number of laterally-projecting lugs arranged at equal intervals apart, which during the revolution of shaft F engage an arm k, projecting rearwardly from a transverse rock-shaft K, which leads to and constitutes the actuating-shaft for the seed-feeding devices.

What I claim as new is—

1. The combination with the frame of a check-rower, of a marker-shaft, and revolving markers on the ends thereof, and crossed links connecting said shaft to said frame.

2. The combination with the parts of a check-rower the relative position of which to the draft-rigging is always the same, and said draft-rigging, of a marker-shaft, revolving markers on the ends of the same, and crossed links connecting said shaft to said parts.

3. The combination with the parts of a check-rower the relative position of which to the tongue is always the same, and said tongue, of a marker-shaft, revolving markers on the ends of the same, and crossed links connecting said shaft to said parts.

4. The combination with the parts of a check-rower the relative position of which to the draft-rigging is always the same, and said draft-rigging, of a trailing transverse marker-shaft, revolving markers on the ends of the same, and crossed links connecting said shaft to said parts.

5. The combination with the rectangular frame of a check-rower, wheels supporting the same, a rigid tongue therefor, and links pivotally secured at or near the rear angles of said frame and crossed, of a marker-shaft, bearing devices for said shaft which are pivotally connected to the rear ends of said links, and revolving markers on the ends of said marker-shafts.

6. The combination with supporting-frame of a check-rower, draft-rigging rigidly secured thereto, a transverse marker-shaft, and revolving markers on the ends thereof, of crossed links connecting said supporting-frame and marker-shaft which cross at a point alining with said draft-rigging when said marker-shaft is in its transverse position.

7. The combination with a rectangular frame of a check-rower, supporting-wheels for the same, a transverse hopper-frame secured to the front end of said rectangular frame, and a tongue rigidly secured to said hopper-frame, hoppers, seed-feeding devices therefor, of a transverse marker-shaft operatively connected to said devices and crossed links connecting the same to the rear of said rectangular frame.

8. The combination with a rectangular frame of a check-rower, supporting-wheels for the same, a transverse hopper-frame articulately secured to the front end of said rectangular frame, and a tongue rigidly secured to said hopper-frame, hoppers, seed-feeding devices therefor, of a transverse marker-shaft operatively connected to said devices, and crossed links connecting the same to the rear of said rectangular frame.

9. The combination with the supporting-frame of a check-rower, wheels therefor, transverse hopper-frame secured to the forward end of the same, hoppers, seed-feeding devices therefor, and a transverse shaft journaled in the forward part of said supporting-frame, of a trailing transverse marker-shaft links connecting the same to said supporting-frame and devices connecting said marker-shaft and transverse shaft.

10. The combination with the supporting-frame of a check-rower, wheels therefor, transverse hopper-frame secured to the forward end of the same, hoppers, seed-feeding devices, and a transverse shaft journaled in the forward part of said supporting-frame, of a trailing transverse marker-shaft links connecting the same to said supporting-frame, and an endless chain and sprocket-wheels connecting the said marker-shaft and transverse shaft about their centers of length.

11. The combination with the supporting-frame of a check-rower, wheels therefor, transverse hopper-frame secured to the forward end of the same, hoppers, seed-feeding devices therefor mechanism for actuating the same, and a transverse shaft engaging said actuating mechanism journaled in the forward portion of said supporting-frame, marker-shaft, revolving markers on the ends of the same, crossed links connecting said marker-shaft and supporting-frame, and endless chain and sprocket-wheels connecting said marker-shaft and transverse shaft.

JOSEPH WILLIAM BETTENDORF.

Witnesses:
HENRY BELLINGHAUSEN,
W. H. FORREST.